United States Patent
Collings et al.

(10) Patent No.: US 7,254,335 B1
(45) Date of Patent: Aug. 7, 2007

(54) STACKABLE WDM ARRANGEMENT

(75) Inventors: Brandon C. Collings, Middletown, NJ (US); Anthony L. Lentine, Holmdel, NJ (US); Martin C. Nuss, Fair Haven, NJ (US); Graham Smith, Holmdel, NJ (US); Ted K. Woodward, Fair Haven, NJ (US)

(73) Assignee: CIENA Corporation, Linthicum, MD (US)

( * ) Notice: Subject to any disclaimer, the term of this patent is extended or adjusted under 35 U.S.C. 154(b) by 908 days.

(21) Appl. No.: 10/008,507

(22) Filed: Nov. 8, 2001

Related U.S. Application Data

(60) Provisional application No. 60/251,771, filed on Dec. 7, 2000.

(51) Int. Cl.
 *H04J 14/02* (2006.01)
(52) U.S. Cl. .......................................... 398/82; 398/83
(58) Field of Classification Search .................. 398/58, 398/59, 60, 82, 83, 63, 64, 67, 73, 91, 167

See application file for complete search history.

(56) References Cited

U.S. PATENT DOCUMENTS 6,091,869 A * 7/2000 Sundelin ...................... 385/24
6,208,443 B1 * 3/2001 Liu et al. ......................... 398/9
6,542,660 B1 * 4/2003 Medin et al. .................. 385/24
6,728,486 B1 * 4/2004 Hutchison et al. ............ 398/83

* cited by examiner

*Primary Examiner*—Dalzid Singh
(74) *Attorney, Agent, or Firm*—Clements Walker; Christopher L. Bernard; Tyler S. Brown

(57) ABSTRACT

A module that includes both an "add-in"/"drop-out" pair of ports and a "drop-in"/"add-out" pair of ports comprises an arrangement of elements that combines an optical signal having a chosen wavelength with an optical signal applied at the "add-in" port, and outputs the combined signal at the "add-out port." Concurrently, the module extracts an optical signal with the same wavelength from an optical signal applied at the "drop-in" port signal, yielding an optical signal at the "drop-out" port that is missing that same wavelength. When the amount of information that needs to be sent from a first network node to a second, remote, node, is greater than that which a single wavelength can handle, a plurality of the above-described modules are interconnected within the first node by optically coupling the "add" ports in a "daisy chain" fashion and the "drop" ports in a "daisy chain" fashion, with each module operating at a different wavelength.

34 Claims, 10 Drawing Sheets

STACKABLE WDM ARRANGEMENT

RELATED APPLICATION

This application relates to provisional application filed Dec. 7, 2000, which bears the Application No. 60/251,771, which is incorporated herein in its entirety.

BACKGROUND

This invention relates to fiber optic networks, and particularly to WDM optical networks.

The public's increasing demand for bandwidth has accelerated the interest in wavelength division multiplexing (WDM) technology. Using WDM, data can be transmitted at high rates on each of several wavelengths of light, sharing a single optical fiber. Currently, systems exist in which a fiber carries over 100 Gb/s of data using 40 or more wavelengths. Conventionally, individual optical channels are "dropped" by inserting a filter in the main fiber path. The filter diverts, and thus effectively extracts, a given wavelength to a separate port that, often, is connected to equipment that demodulates the diverted optical signal to recover data that had previously modulated an optical signal at that given wavelength. Similarly, the addition of an optical channel is typically achieved by the insertion of a filter in the main fiber path, which filter injects light arriving at the node at a desired wavelength into the main optical path. When multiple wavelengths are to be dropped or added, either multiple optical filters must be inserted in the main optical path at the location of the node, or a multi-wavelength multiplexer/demultiplexer is used.

An effective design approach is needed for efficient utilization of optical fiber capacity.

SUMMARY

An advance in the art is achieved with an arrangement that interconnects optical modules that comprise both an "add-in"/"drop-out" pair of ports and a "drop-in"/"add-out" pair of ports. The module includes a conventional arrangement of elements that combines an optical signal having a chosen wavelength with an optical signal applied at the "add-in" port, and outputs the combined signal at the "add-out port." Concurrently, the module extracts an optical signal with the same wavelength from an optical signal applied at the "drop-in" port signal, yielding an optical signal at the "drop-out" port that is missing that same wavelength.

When the amount of information that needs to be sent from a first network node to a second, remote, node, is greater than that which a single wavelength can handle, a plurality of the above-described modules are interconnected within the first node by optically coupling the "add" ports in a "daisy chain" fashion and the "drop" ports in a "daisy chain" fashion, with each module operating at a different wavelength. A similar arrangement is effected at the remote node, and two-way communication between the two nodes is realized with two-fiber optical link that couples the two nodes.

DETAILED DESCRIPTION

Figure 1:
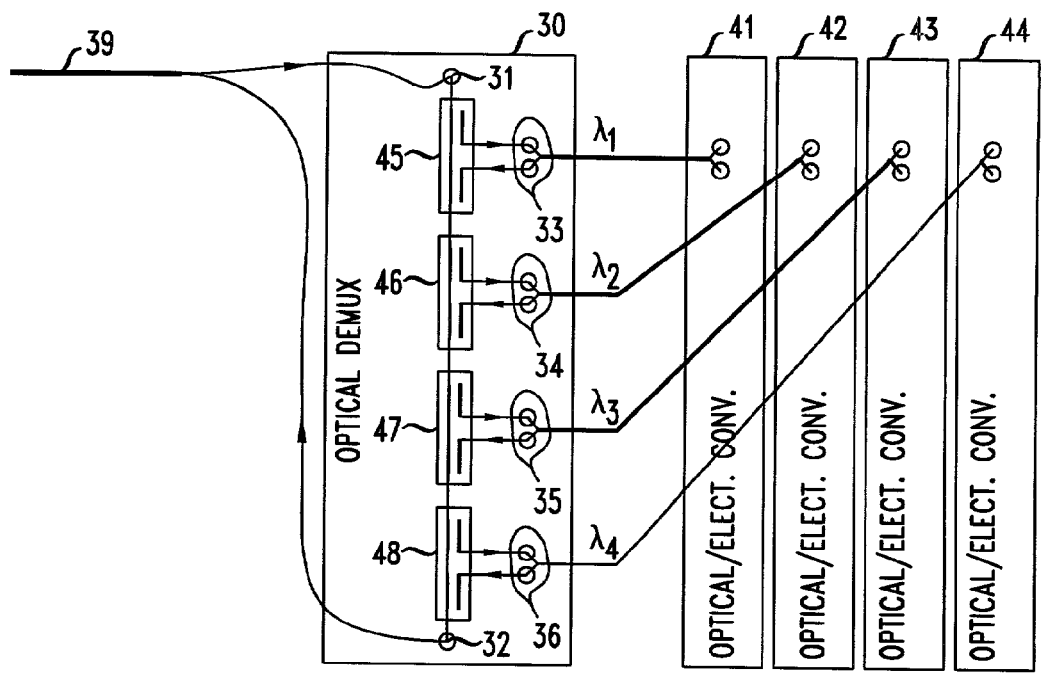
FIG. 1 depicts the prior art arrangement of equipment in a WDM system.

FIG. 1 depicts a conventional WDM arrangement that includes equipment modules 30, 41, 42, 43, and 44. These modules are typically installed in an equipment frame, or rack, often as depicted in FIG. 1. Module 30 is an "add/drop" module that basically extracts specific, different, wavelengths that are present on an incoming fiber of a duplex fiber cable 39 connected to input port 31, and injects the very same wavelengths to result in an output WDM optical signal at output port 32 that is coupled to the second fiber in duplex fiber cable 39. More specifically, module 30 has a filter element 45 that receives an optical signal from input port 31, and develops an output. Filter element 46 receives an optical signal from the output of filter element 45, and develops an output. Filter element 47 receives an optical signal from the output of filter element 46, and develops an output. Lastly, filter element 48 receives an optical signal from the output of filter element 47, and develops an output that is applied to output port 32. Filter elements 45-48 are basically identical except that each extracts and injects an optical signal of a different wavelength. More specifically, filter element 45 effectively comprises two serially connected components, where the first component extracts an optical signal of a specified wavelength ($\lambda_1$), and the second component inject an optical signal of the same specified wavelength. Accordingly, filter element 45 outputs an optical signal of wavelength $\lambda_1$ at port 33 and receives an optical signal at port 33. Similarly, filter element 46 outputs an optical signal of wavelength $\lambda_2$ at port 34 and receives an optical signal at port 34, filter element 47 outputs an optical signal of wavelength $\lambda_3$ at port 35 and receives an optical signal at port 35, and filter element 48 outputs an optical signal of wavelength $\lambda_4$ at port 36 and receives an optical signal at port 36. Ports 33-36 are duplex ports, and they are coupled with duplex "leads" to optical-to-electrical converter modules 41-44, respectively. Each such converter accepts a modulated optical signal of a specified wavelength and converts the information contained therein to electronic form, as well as, conversely, modulated information unto an optical signal of the specified wavelength.

Figure 2:
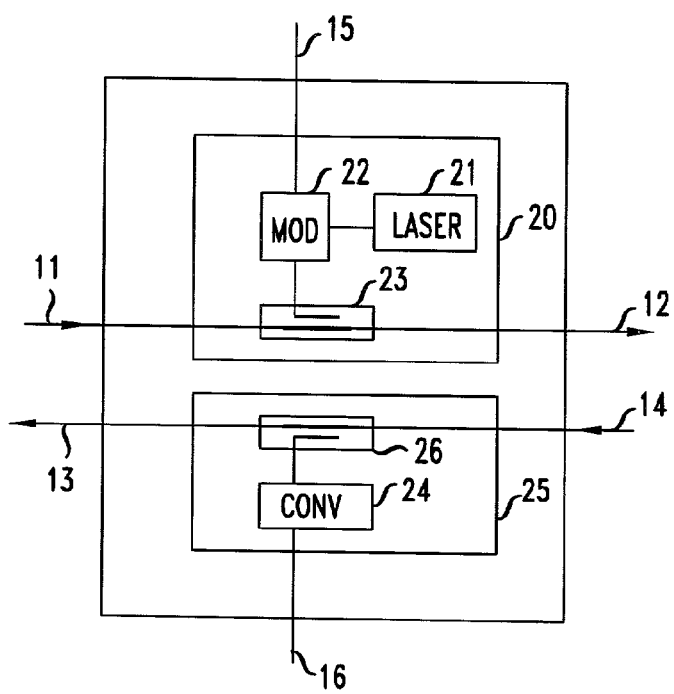
FIG. 2 presents a block diagram of a single add/drop communication module.

FIG. 2 presents a block diagram of an add/drop communication module 10 that is employed in some of the arrangements disclosed herein. It comprises a conventional "add" submodule 20 that is interposed between "add-in" port 11 and "add-out" port 12, and a "drop" submodule 25 that is interposed between "drop-in" port 14 and "drop-out" port 13. Specifically, submodule 20 comprises a laser 21, a modulator 22 that is responsive to an electronic signal arriving from input data port 15 and to the output of laser 21, developing an optical signal that is modulated by the input data signal, and a filter 23 that combines the optical energy developed by element 22 with the optical energy arriving at port 11 (much like the second component within filter 45). The output of filter 23 forms the output of submodule 20 that is applied to port 12. Submodule 25 comprises a filter 26 (much like the first component within filter 45) that accepts optical energy from port 14 in a range of wavelengths and separates that energy into two optical signals: one signal that is applied to converter 24, which includes signals within a narrow band of a preselected wavelength, and one signal that is applied to port 13, which includes signals with the remaining wavelengths. Converter 24 extracts electronic signal that modulates the optical signal that is applied thereto, and applies the extracted electronic signal to port 16. There is no inherent requirement (as in the filter of element 45) that the wavelength extracted by filter 26 be identical to the wavelength of the signal injected into filter 23, although in the context of this disclosure that is the practice.

Figure 3:
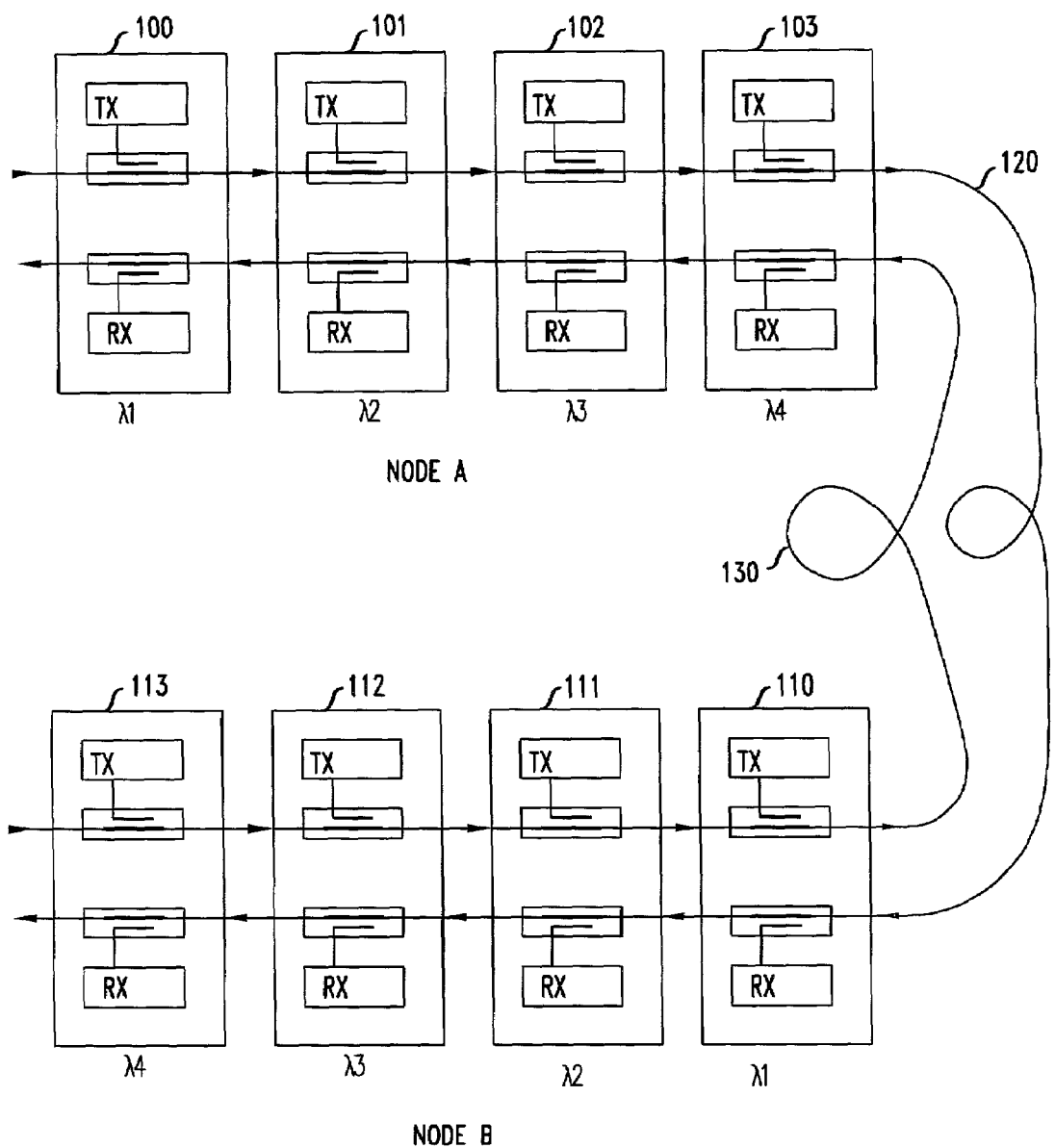
FIG. 3 depicts a First-In-First-Out (FIFO) arrangement of nodes A and B.

FIG. 3 presents an arrangement in accordance with the principles disclosed herein. It comprises modules 100, 101, 102, and 103 in a network node A, and modules 110, 111, 112, and 113 in a second, remote, network node B. The interconnections within node A are such that the "add-out" port of one module (e.g. module 100) connects to the "add-in" port of the next module in the direction of signal flow (i.e., module 101). Herein, this interconnection pattern is referred to as a "daisy chain" interconnection pattern. The signal flow through the "drop" ports is in the opposite direction but the notion is the same; to wit, the "drop-out" port of one module (e.g. module 103) connects to the "drop-in" port of the next module (i.e., module 102). The arrangement at node B is identical to that at node A with respect to the interconnection of the various modules.

Nodes A and B are interconnected by a pair of optical paths (e.g., fibers 120 and 130) that form a duplex, bi-directional, optical cable. Fiber 120 passes signals from node A to node B by connecting the "add-out" output of module 103 to the "drop-in" input of module 110. Fiber 130 passes signals from node B to node A by connecting the "add-out" output port of module 110 to the "drop-in" input of module 103. The arrangement of elements disclosed in FIG. 3 permits placing the "add-out" port of module 103 (to which fiber 120 is connected) to be in close physical proximity (i.e., less than 2 inches apart) to the "drop-in" input port of module 103 (to which fiber 130 is connected). This is a significant advantage because fibers 120 and 130 are sheathed within a single cable, and the separated fiber ends that extend from the cable (often called "pig tails") can be short and of roughly equal lengths, and be easily installed.

The set of wavelengths that is used for the various interconnected modules in node B ought to be identical to the set of wavelengths used in the modules of node A (unless these modules interact with other (not shown) module), if it is desired to have each module in node A exchange information with some module in node B. There is a one-to-one relationship between the modules of node A and node B. The sequence of wavelengths that is used in node B does not have to be related to the sequence of wavelengths used in node A (the depicted sequence in modules 100, 101, 102, and 103 of node A being $\lambda_1$, $\lambda_2$, $\lambda_3$, $\lambda_4$, respectively). Advantageously, however, some order is beneficial; and the most beneficial order is one where the sequence of wavelengths used in node B is identical to the order used in node A. This order, which results in the same loss at all wavelengths (because all wavelengths go through the same number of modules between the point where the wavelength is added and the point where the wavelength is dropped), yields what is known as a FIFO (First In-First Out) arrangement. This is the arrangement shown in FIG. 3.

Figure 4:
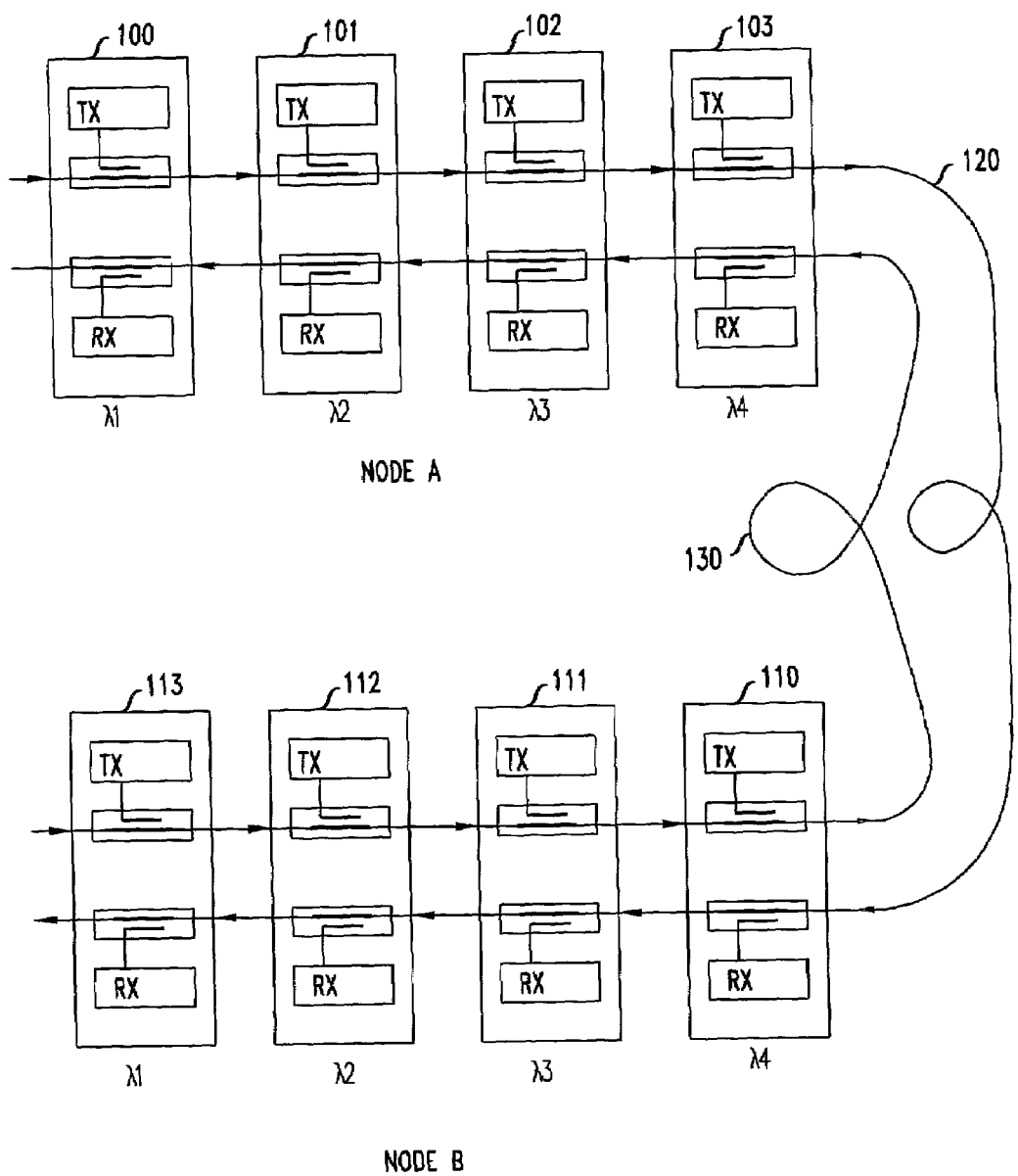
FIG. 4 depicts a First-In-Last-Out (FILO) arrangement of nodes A and B.
Figure 5:
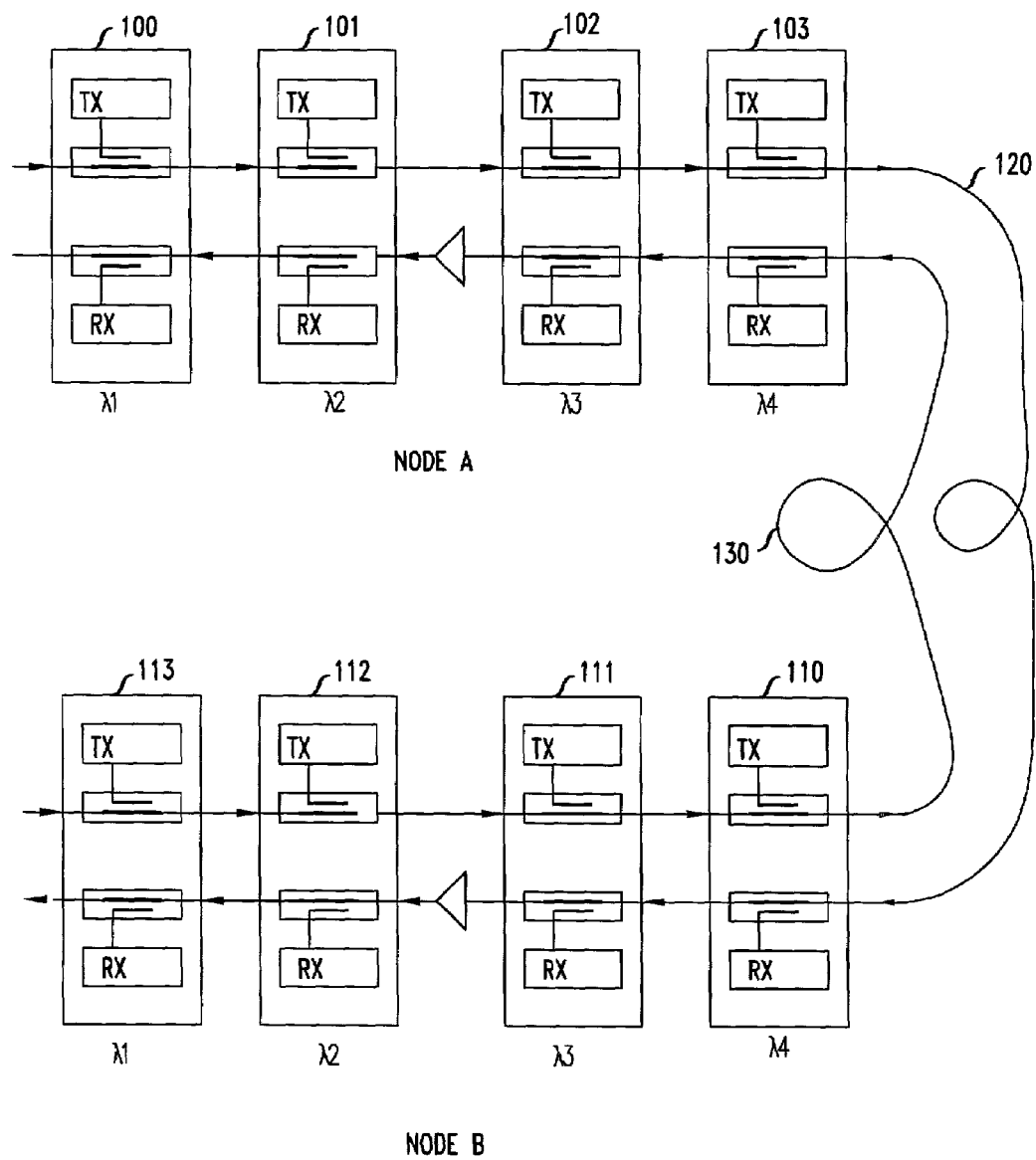
FIG. 5 depicts a FILO arrangement of nodes A and B, with amplifiers for boosting signal power.

Another arrangement, which is beneficial simply because it is orderly and simple to provision, is a FILO arrangement. In a FILO arrangement the wavelength that was added first is dropped last. Such an arrangement is shown in FIG. 4. A disadvantage of the FILO arrangement over the FIFO arrangement is that each wavelength is subjected to a different amount of attenuation, ranging from one wavelength that is attenuated by 2N modules (where N is the number of modules in nodes A) to another wavelength that is attenuated by no modules. One solution to the attenuation issue is the insertion of amplifiers as shown, for example, in FIG. 5.

Figure 6:
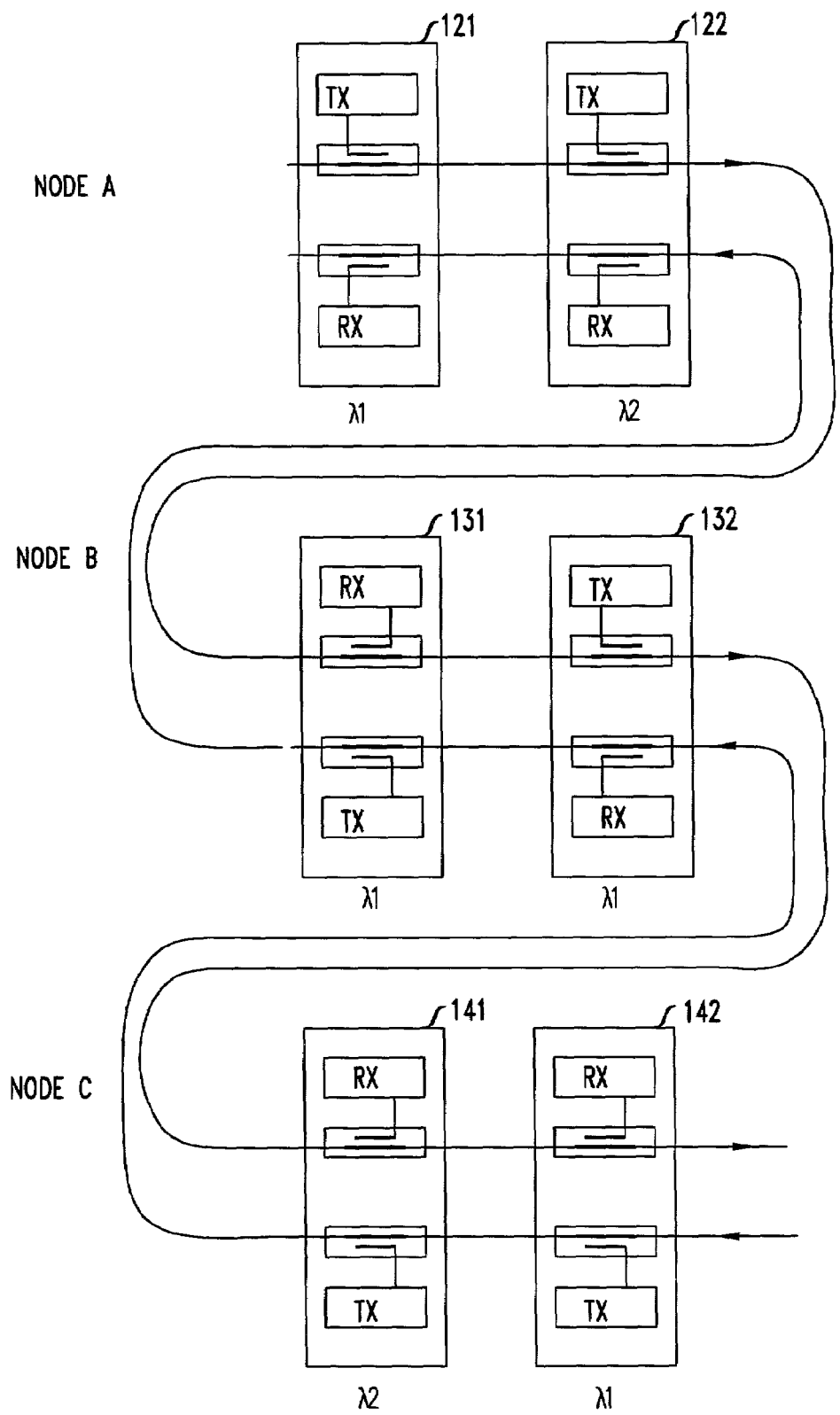
FIGS. 6 and 7 show different arrangements with a mid-span node.

FIG. 6 presents an arrangement that involves nodes A, B, and C. Nodes A and C are terminal nodes, and node B is a mid-span node. In FIG. 6, node A employs wavelengths $\lambda_1$, and $\lambda_2$, where $\lambda_1$ is used to communicate with a module in node B and $\lambda_2$ is used to communicate with a module in node C. The second module in node B communicates with the second module in node C. In accord with the principles disclosed herein, the module in node B that communicates in some wavelength with a module in node A (e.g., $\lambda_1$ in FIG. 6) precedes—in the signal path where signals flow from node A to node B, then to node C—the module in node B that communicates in the same wavelength with a module in node C. That means that module 131, which extracts a signal of wavelength $\lambda_1$ from the upper optical signal path where signals flow from left to right, precedes module 132. Having first extracted the signal at wavelength $\lambda_1$, module 132 can inject a signal of the same wavelength $\lambda_1$. In the opposite direction, module 132 extracts the $\lambda_1$ signal from the lower optical path where signals flow from right to left (injected by module 141) and once that wavelength is extracted, module 131 can inject a signal of the same wavelength $\lambda_1$. Thus, module 121 communicates with module 131, module 122 communicates with module 142, and module 132 communicates with module 141. The important point to note is that in an arrangement where there is a mid-span node, such as node B in FIG. 6, a wavelength can be reused. However, it is necessary to drop, or extract, that wavelength in the mid-span node before injecting data at that wavelength reuses it.

Figure 7:
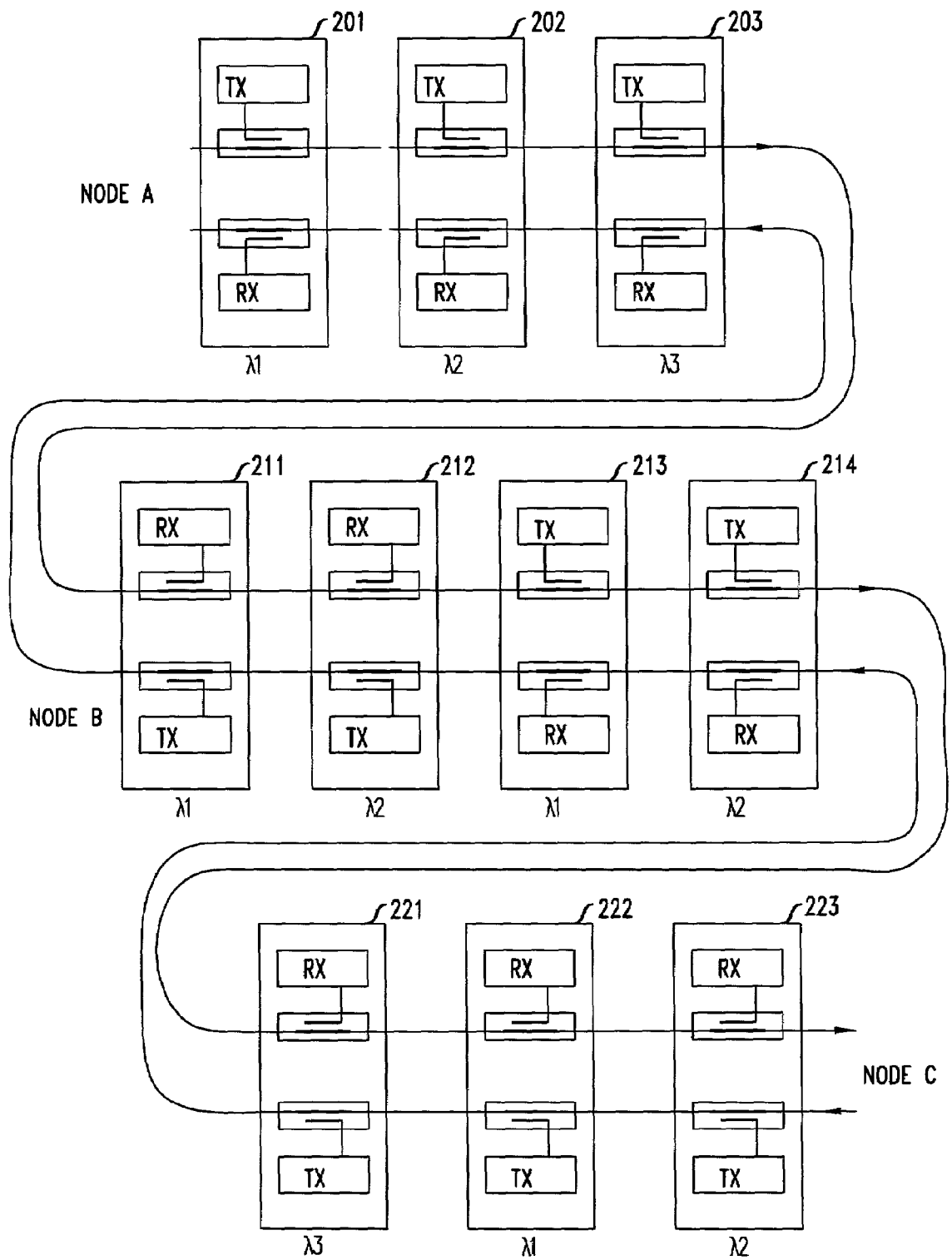

FIG. 7 shows an arrangement where node B has four modules, and two wavelengths ($\lambda_1$, and $\lambda_2$) are dropped in modules 211 and 212 of node B before they are reinserted in module 213 and 214 of node B (in the optical path where signals flow in node B from left to right). In FIG. 7, the $\lambda_1$ wavelength is extracted in module 211 and reinserted in module 213, and thereafter, wavelength $\lambda_2$ is extracted in module 212 and reinserted in module 214. One can almost think of module B as two successive modules B' and B"; each of which, in accordance with the principles of this invention comprises two separate and distinct paths, with one path comprising a serial connection of solely "drop-out"

submodules, and the one path comprising a serial connection of solely "add-in" submodules.

Figure 8:
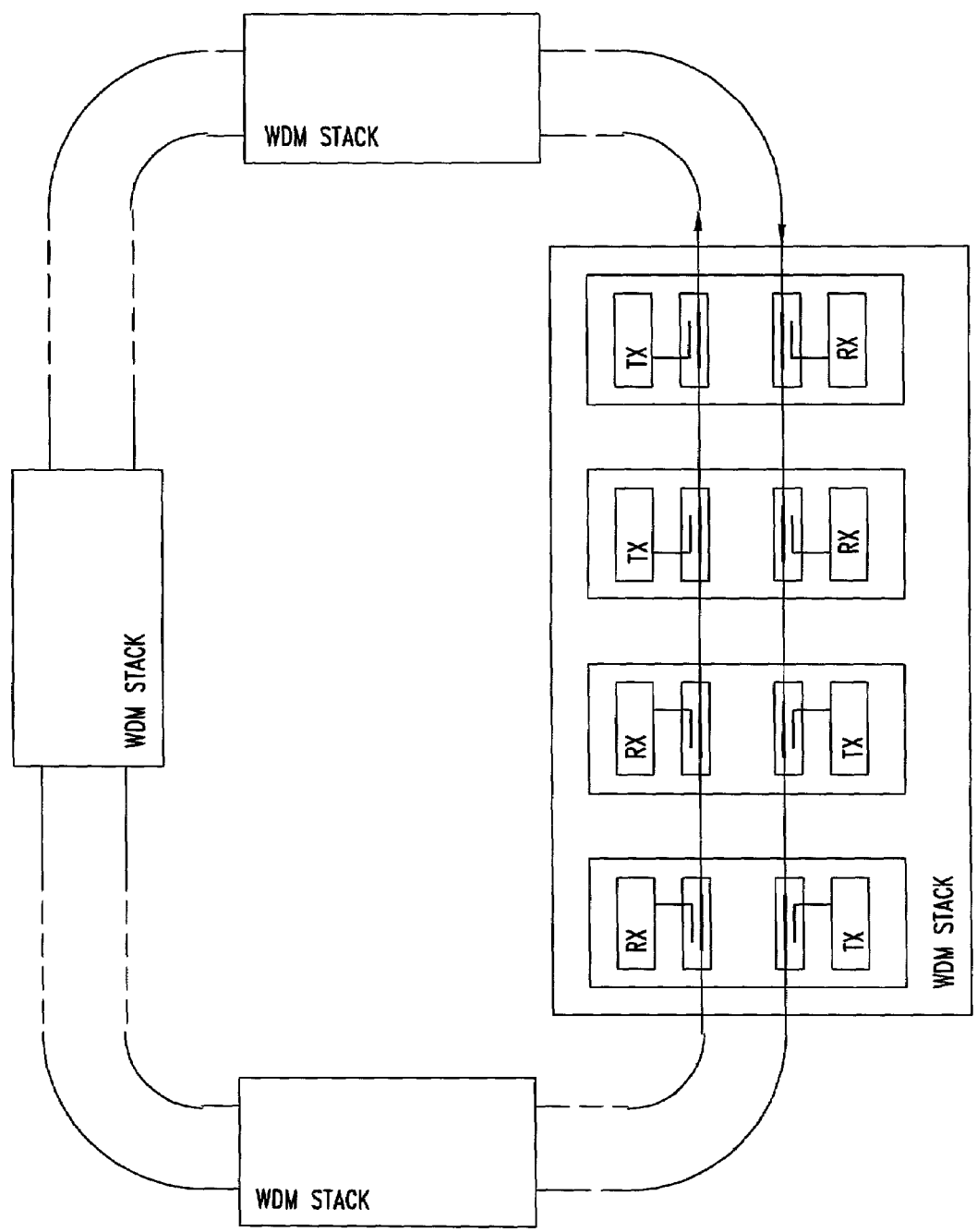
FIG. 8 presents a protected ring arrangement in conformance with the principles of this invention.

FIG. 8 presents a block diagram of an arrangement that is suitable for insertion in a protected ring—which is a ring that employs two independents closed paths where signals flow in opposite directions. The arrangement illustrated provides for the dropping and adding of groups of up to four wavelengths when four modules are used.

Figure 9A:
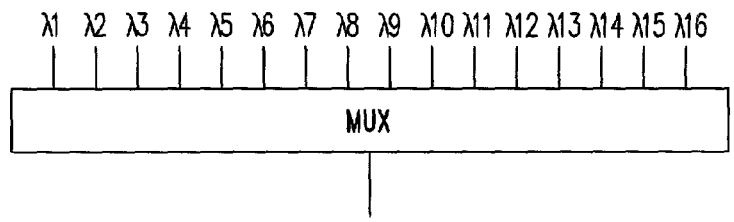
FIGS. 9A and 9B show one-level and two-level multiplexers, respectively, that can be employed in an embodiment where a group of wavelengths is extracted from, or injected into an optical signal.
Figure 9B:
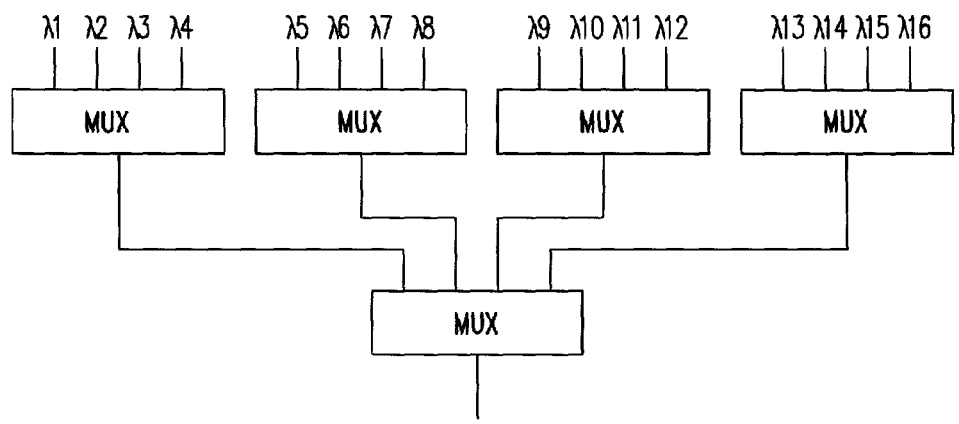

It may be noted that the arrangements disclosed so far effectively present a serial approach to the dropping and adding of wavelengths, and since each add/drop module imposes a loss to the wavelengths that merely pass through the module, it follows that the number of modules that may be used between a point where a wavelength is injected and the point where the same wavelength is extracted ought to be limited. This limitation is overcome by handling a group of wavelengths at each module, constituting an optical signal of a preselected band of wavelengths $\kappa_i$, where the optical signal of band $\Lambda_i$ is constructed with a multiplexer that contains one or more levels, and the group is dispersed with a corresponding demultiplexer. This is illustrated in FIG. 9A with a single-level multiplexer that has 16 ports, and in FIG. 9B with a two-level multiplexer arrangement that employs multiplexer elements that have 4 ports each. Advantageously, the subgroups of wavelengths in FIG. 9B, $\Lambda_{i1}, \Lambda_{i2}, \Lambda_{i3}, \ldots$ are adjacent to each other, and disjoint. For example wavelengths $\lambda_1$ through $\lambda_4$ are all shorter than wavelengths $\lambda_5$ through $\lambda_8$, etc. The multiplexing of the various wavelengths in a group into a single signal, and the corresponding demultiplexing of a group signal into the individual wavelengths that form the group (which is not explicitly shown) may be accomplished with a conventional manner.

Figure 10:
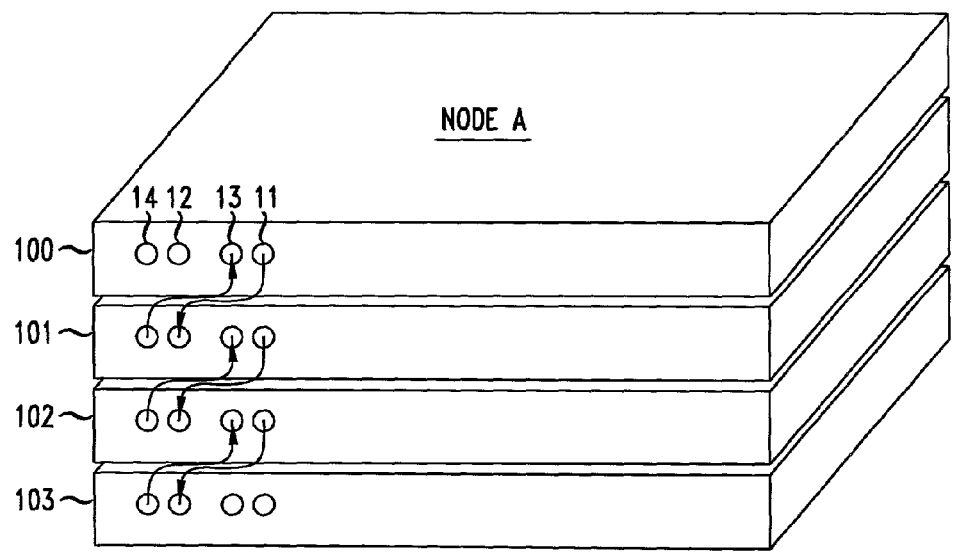
FIG. 10 shows one physical layout of add-in, add-out, drop-in and drop-out ports on an equipment module, and the interconnection of a stack of modules.

The physical arrangement of the ports on a module affects the practical process of interconnecting the FIG. 1 modules. A good arrangement results in a simple, uniform, pattern of interconnections that, in turn, leads to a simple interconnections task. The structure disclosed herein enables the equipment designer to effect a physical arrangement where the "add-out" and the "drop-in" ports are in close physical proximity to each other and, similarly, the "add-in" and the "drop-out" port are in close physical proximity to each other. This is illustrated in FIG. 10, where the interconnection of the four FIG. 3 modules (100-103) is shown, and where each module has the "add-out" port 11 in close proximity to the "drop-in" port 13 and the "add-in" port 12 in close proximity to the "drop-out" port 14. This arrangement results is a very regular interconnection pattern for the node, which is very important because it permits installation and maintenance personnel to quickly effect correct interconnections.

Figure 11:
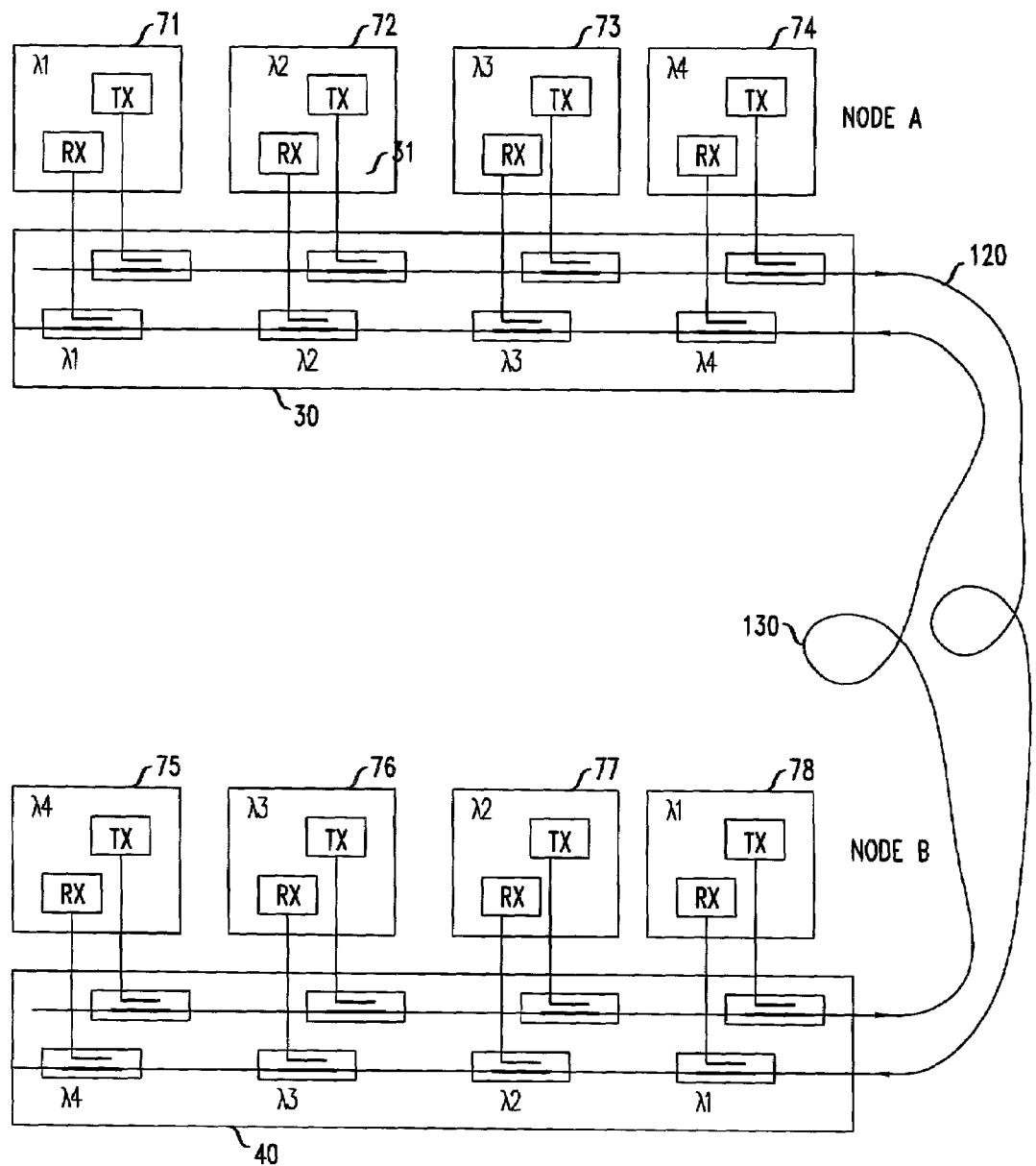
FIG. 11 depicts an arrangement where the wavelength extracting and wavelength injecting filters in a node are combined within a single piece of equipment.

It may be noted that the FIG. 1 module, which results in the FIG. 10 interconnection when four modules are desired to be interconnected, yields an arrangement where a disruption occurs if a module needs to be replaced. Although optical modules are typically very reliable, and the replacement of a module is a task that is measured in seconds (or at least it ought to be, in light of the interconnection simplicity of modules constructed in accord with the principles disclosed herein), it must be pointed out that replacing a module does disrupt the optical signal and, consequently, for a short duration all wavelengths are lost. By separating the filters that extract (or inject) a wavelength from the optical-to-electrical conversion means (or electrical-to-optical conversion means) and placing all of the filters of a node in a separate equipment module yields an arrangement where the conversion modules can be removed and replaced with no disruption to the system's operation except for the communication channel where the conversion module is replaced. This is illustrated in FIG. 11, where all of the filters of node A in the FIG. 3 arrangement are combined in equipment module 30, leaving four conversion modules 71-74 that, in a sense, correspond to modules 100-103 of FIG. 3.

Figure 12:
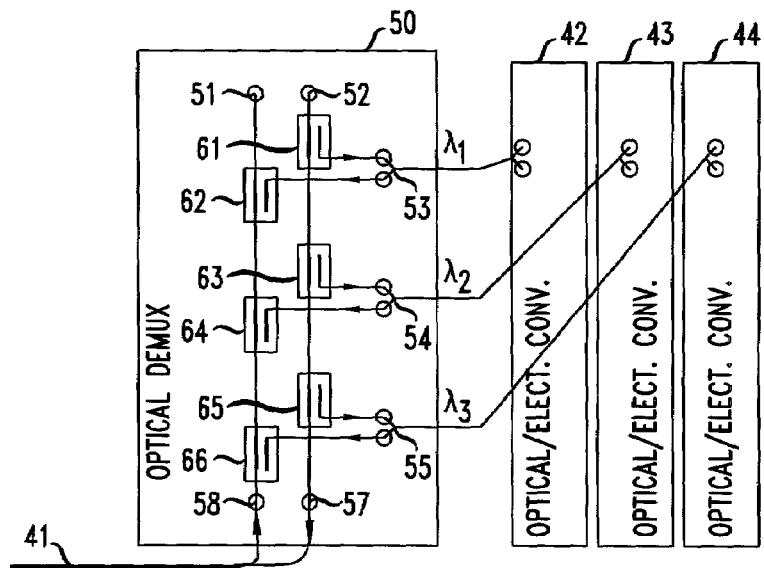
FIG. 12 shows a WDM module arrangement, in accord with the filter notion presented in FIG. 11, for the first node in FIG. 7.

FIG. 12 shows a WDM arrangement in accordance with the principles disclosed herein, for node A of FIG. 7 where module 50 comprises a series of filter pairs 61-62, 63-64, and 65-66, operating at respective wavelengths $\lambda_1, \lambda_2,$ and $\lambda_3$. Filter pair 61-62 interacts with duplex optical port 53 that is coupled to optical/electrical converter module 42. Similarly, filter pair 63-64 interacts with duplex optical port 54 that is coupled to optical/electrical converter module 43, and filter pair 65-66 interacts with duplex optical port 55 that is coupled to optical/electrical conversion module 44. Node A interacts with node B through ports 57 and 58 that are coupled to filters 65 and 66, respectively. Artisans should quickly realize that the FIG. 12 arrangement could be used for node C of FIG. 7.

Figure 13:
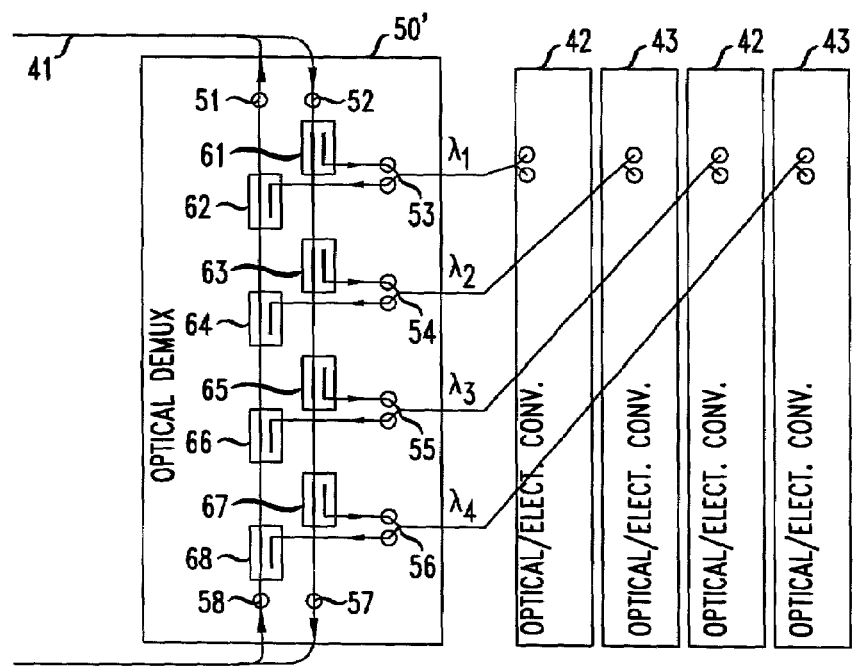
FIG. 13 shows a WDM module arrangement, in accord with the filter notion presented in FIG. 11, for the mid-span node in FIG. 7.

FIG. 13 shows a WDM arrangement in accordance with the principles disclosed herein, for mid-span node B of FIG. 7. It is very similar to the FIG. 12 arrangement, except for the specific wavelengths employed, and the user of four filter pairs within module 50' (and four corresponding optical/electrical conversion modules). It may be noted that module 50' can be replaced with two, serially connected, modules (x) each of which handles wavelengths $\lambda_1,$ and $\lambda_2$. A module x is, thence, a module that comprises serially connected filter pairs, each operating at a different wavelength.

The disclosure above presents the principles of this invention by way of illustrative embodiments, but it should be understood that various modifications and variations could be implemented without departing from the scope and spirit of this invention, as defined in the following claims. To give just one example, the implementations depicted in the drawings contemplate using fibers to interconnect nodes. Free space, however, can also be used in some applications.

We claim:

1. A node comprising:
    a series connection of elements $E_i$, i=1, 2, ... N, where N is greater than 1, forming a first optical path, where each of said elements $E_i$ injects an optical signal of band $\Lambda_1$, and where $\Lambda_i$ is disjoint from $\Lambda_j$ for all i≠j;
    a series connection of elements $F_i$, i=1, 2, ... N, forming a second optical path, where each of said elements $F_i$ extracts an optical signal of band $\Lambda_i$;
    a plurality of transmitters $T_i$, i=1, 2, ... N, coupled to said elements $E_i$ on a one to one basis; and
    a plurality of a receivers $R_i$, i=1, 2, ... N, coupled to said elements $F_i$ on a one to one basis;
    wherein a collection of elements that includes element $E_i$, element $F_i$, transmitter $T_i$, and receiver $R_i$ are housed in a single equipment module $M_i$, resulting in said node comprising a serially interconnected set of modules $M_i$, i=1, 2, ... N, with said interconnected set having
    an add-in node input port that is connected to module $M_1$,
    a drop-out node output port that is connected to module $M_1$,
    an add-in node output port that is connected to module $M_N$, and
    a drop-out node input port that is connected to module $M_N$.

2. The node of claim 1 where said first optical path and said second optical path are physically separate paths.

3. The node of claim 1 where each of said bands, $\Lambda_i$, is a narrow band that carries a single channel of communication.

4. The node of claim 1 where each of said bands, $\Lambda_i$, is substantially a single wavelength.

5. The node of claim 1 where at least one of said elements $E_k$, that injects band $\Lambda_k$ carries a plurality of independent channels of communication.

6. The node of claim 5 where at least one of said transmitters, $T_k$, includes an optical multiplexer that combines optical signals, each of said signals constituting one channel of communication, to form an optical signal of band $\Lambda_k$.

7. The node of claim 6 where said multiplexer is a multi-level multiplexer.

8. The node of claim 1 where each of said bands, $\Lambda_i$, comprises a plurality of narrow bands centered about wavelengths $\lambda_j$, j=1, 2, ... M, where M is an integer greater than 1, and each of said narrow bands constitutes an information channel.

9. The node of claim 8 where said narrow bands are composed of essentially a single wavelength, where wavelength $\lambda_j$ is different from $\lambda_k$ for all j≠k.

10. The node of claim 1 wherein a collection of elements that includes element $E_i$, element $F_i$, transmitter $T_i$, and receiver $R_i$ are housed in a single equipment module $M_i$, resulting in said node comprising a plurality of modules $M_i$, i=1, 2, ... N that are serially connected.

11. The node of claim 1 where said add-in node input port, and said drop-out node output port are in close physical proximity to each other, and said add-in node output port, and said drop-out node input port are in close physical proximity to each other.

12. The node of claim 1 where
said elements $E_i$ and $F_i$, i=1, 2, ... N, are housed in a single equipment module that includes ports $P_i$, i=1, 2, ... N, with each $P_k$ being coupled to elements $E_k$ and $F_k$; and
transmitter $T_i$ and receiver $R_i$ form a conversion module $C_i$ that is outside said single equipment module, thereby resulting in a plurality of conversion modules $C_i$, i=1, 2, ... N, with each conversion module $C_k$ being coupled to port $P_k$, for all values of k=1, 2, ... N.

13. The node of claim 1 where
each element $E_i$ has an input port and an output port, each element $E_i$ has its output port connected to input port of element $E_{i+1}$, the input port of element $E_1$ forms an add-in node input port, and the input port of element $E_N$ forms an add-in node output port, and
each element $F_i$ has an input port and an output port, each element $F_i$ has its output port connected to input port of element $F_{i-1}$, the input port of element $F_N$ forms a drop-out node input port, and the input port of element $F_1$ forms a drop-out node output port.

14. The node of claim 1, located in a first communication place, further comprising:
a second node, in a second communication place that is remote from said first communication place, comprising
a series connection of elements $E'_k$, k=1, 2, ... N', where N' is greater than 1, forming a first optical path within said second node, where each of said elements $E'_k$ injects an optical signal of band $\Lambda_k$, and where $\Lambda_k$ is disjoint from $\Lambda_m$ for all k≠m;
a series connection of elements $F'_k$, k=1, 2, ... N', forming a second optical path within said second node, where each of said elements $F'_k$ extracts an optical signal of band $\Lambda_k$;
a plurality of transmitters $T'_k$, k=1, 2, ... N, coupled to said elements $E'_k$ on a one to one basis;
a plurality of a receivers $R'_k$, k=1, 2, ... N, coupled to said elements $F'_k$ on a one to one basis; and
a bi-directional optical path that interconnects said node in said first communication place with said second node in said second communication place.

15. The node of claim 14 where N=N' and each bandwidth $\Lambda_k$ in said node in said second communication place corresponds, and is substantially identical, to one bandwidth $\Lambda_i$ in said first communication place.

16. The node of claim 14 further including a third node, in a third communication place that is remote from both said first communication place and said second communication place, said third node comprising:
a series connection of elements $E''_n$, n=1, 2, ... N'', where N'' is greater than 1, forming a first optical path in said third node, where each of said elements $E''_n$ injects an optical signal of band $\Lambda_n$, and where $\Lambda_n$ is disjoint from $\Lambda_o$ for all n≠o;
a series connection of elements $F''_n$, n=1, 2, ... N', forming a first optical path, where each of said elements $F''_n$ extracts an optical signal of band $\Lambda_n$;
a plurality of transmitters $T''_n$, n=1, 2, ... N', coupled to said elements $E''_n$ on a one to one basis; and
a plurality of receivers $R''_n$, n=1, 2, ... N', coupled to said elements $F''_n$ on a one to one basis; and
a bi-directional optical path that interconnects said second node in said second communication place with said third node in said third communication place.

17. The node of claim 16 where at least one band in said node in said first communication place, $\Lambda_i$, has no matching band $\Lambda_k$ in said second communication place.

18. The node of claim 16 where at least one band in said node in said first communication place, $\Lambda_i$, has a matching band $\Lambda_k$ in said second communication place.

19. The node of claim 14 further including a third communication place that is remote from both said first communication place and said second communication place, said third communication place comprising:
a third node serially connected to a fourth node, where said third node comprises a series connection of elements $E''_n$, n=1, 2, ... N'', where N'' is greater than 1, forming a first optical path in said third node, where each of said elements $E''_n$ injects an optical signal of band $\Lambda_n$, and where $\Lambda_n$ is disjoint from $\Lambda_o$ for all n≠o;
a series connection of elements $F''_n$, n=1, 2, ... N'', forming a first optical path, where each of said elements $F''_n$ extracts an optical signal of band $\Lambda_n$;
a plurality of transmitters $T''_n$, n=1, 2, ... N', coupled to said elements $E''_n$ on a one to one basis; and
a plurality of receivers $R''_n$, n=1, 2, ... N', coupled to said elements $F''_n$ on a one to one basis; and
said fourth node comprises
a series connection of elements $E'''_p$, p=1, 2, ... N''', where N''' is greater than 1, forming a first optical path in said third node, where each of said elements $E'''_p$ injects an optical signal of band $\Lambda_p$, and where $\Lambda_p$ is disjoint from $\Lambda_q$ for all p≠q;
a series connection of elements $F'''_p$, p=1, 2, ... N''', forming a first optical path, where each of said elements $F'''_p$ extracts an optical signal of band $\Lambda_p$;
a plurality of transmitters $T'''_p$, p=1, 2, ... N''', coupled to said elements $E'''_p$ on a one to one basis; and
a plurality of receivers $R'''_p$, p=1, 2, ... N''', coupled to said elements $F'''_p$ on a one to one basis.

20. The node of claim 19 where at least one of said bands $\Lambda_i$ is equal to one of said bands $\Lambda_n$.

21. The node of claim 19 where at least one of said bands $\Lambda_i$ is equal to one of said bands $\Lambda_n$ and also to one of said bands $\Lambda_p$.

22. An arrangement comprising:
    a first node as defined in claim 1, in a first location,
    a second node as defined in claim 1, in a second location that is remote from said first location; and
    a bi-directional optical connection between said first node and said second node.

23. The arrangement of claim 22 where said optical connection comprises an optical path from said add-in node output port of said first node to said drop-out node input port of said second node, and an optical path from said add-in node output port of said second node to said drop-out node input port of said first node.

24. An arrangement comprising a plurality of nodes as defined in claim 1, said plurality of nodes interconnected to form a ring.

25. A node comprising:
    a first series connection of N elements, where N is greater than 1, forming a first optical path in a first node, where each of the elements in said first series injects an optical signal of a preselected band of wavelengths, and where bands of wavelengths of the different elements in said first series are disjoint from each other;
    a second series connection of N elements, forming a second optical path in said first node that is disjoint from said first optical path, where each of the elements in said second series extracts an optical signal of a preselected band of wavelengths, and where bands of wavelengths of the different elements in said second series are the same as the bands of wavelengths of the different elements in said first series;
    a plurality of transmitter elements, with each one of said transmitter elements being coupled to a different one of said N elements in said first series connection of N elements; and
    a plurality of receiver elements, with each one of said receiver elements being coupled to a different one of said N elements in said second series connection of N elements.

26. An arrangement comprising:
    A first module that includes
        a) an add-in port that leads to a set of elements that add an optical signal of a first wavelength,
        b) an add-out port that outputs an optical signal from said set of elements that add an optical signal,
        c) a drop-in port that leads to a set of elements that extract an optical signal of said first wavelength, and
        d) a drop-out port that outputs an optical signal from said set of elements that extract an optical signal;
    A second module that includes
        a) an add-in port that leads to a set of elements that add an optical signal of a second wavelength,
        b) an add-out port that outputs an optical signal from said set of elements that add an optical signal,
        c) a drop-in port that leads to a set of elements that extract an optical signal of said second wavelength, and
        d) a drop-out port that outputs an optical signal from said set of elements that extract an optical signal; and
    connections that optically connect the add-out port of said first module to the add-in port of said second module, and the drop-out port of said second module is optically connected to the drop-in port of said first module.

27. The arrangement of claim 26 further comprising:
    A third module that includes
        a) an add-in port that leads to a set of elements that add an optical signal of a second wavelength,
        b) an add-out port that outputs an optical signal from said set of elements that add an optical signal,
        c) a drop-in port that leads to a set of elements that extract an optical signal of said second wavelength, and
        d) a drop-out port that outputs an optical signal from said set of elements that extract an optical signal;
    A fourth module that includes
        a) an add-in port that leads to a set of elements that add an optical signal of a first wavelength,
        b) an add-out port that outputs an optical signal from said set of elements that add an optical signal,
        c) a drop-in port that leads to a set of elements that extract an optical signal of said first wavelength, and
        d) a drop-out port that outputs an optical signal from said set of elements that extract an optical signal; and
    connections that optically connect the add-out port of said third module to the add-in port of said fourth module, and the drop-out port of said fourth module is optically connected to the drop-in of said third module.

28. The arrangement of claim 26 further comprising:
    A third module that includes
        a) an add-in port that leads to a set of elements that add an optical signal of a first wavelength,
        b) an add-out port that outputs an optical signal from said set of elements that add an optical signal,
        c) a drop-in port that leads to a set of elements that extract an optical signal of said first wavelength, and
        d) a drop-out port that outputs an optical signal from said set of elements that extract an optical signal;
    A fourth module that includes
        a) an add-in port that leads to a set of elements that add an optical signal of a second wavelength,
        b) an add-out port that outputs an optical signal from said set of elements that add an optical signal,
        c) a drop-in port that leads to a set of elements that extract an optical signal of said second wavelength, and
        d) a drop-out port that outputs an optical signal from said set of elements that extract an optical signal; and
    connections that optically connect the add-out port of said third module to the add-in port of said fourth module, and the drop-out port of said fourth module is optically connected to the drop-in of said third module.

29. A node comprising:
    a first sub-node serially connected to a second sub-node, where said first sub-node comprises
    a series connection of elements $E''_n$, n=1, 2, ... N", where N" is greater than 1, forming a first optical path in said first node, where each of said elements $E''_n$ injects an optical signal of band $\Lambda_n$, and where $\Lambda_n$ is disjoint from $\Lambda_o$ for all n≠o;
    a series connection of elements $F''_n$, n=1, 2, ... N", forming a first optical path, where each of said elements $F''_n$ extracts an optical signal of band $\Lambda_n$;
    a plurality of transmitters $T''_n$, n=1, 2, ... N", coupled to said elements $E''_n$ on a one to one basis; and
    a plurality of receivers $R''_n$, n=1, 2, ... N", coupled to said elements $F''_n$ on a one to one basis; and said second sub-node comprises
- a series connection of elements $E'''_p$, p=1, 2 ... N''', where N''' is greater than 1, forming a first optical path in said second sub-node, where each of said elements $E'''_p$ injects an optical signal of band $\Lambda_p$, and where $\Lambda_p$ is disjoint from $\Lambda_q$ for all p≠q;
- a series connection of elements $F'''_p$, p=1, 2, ... N''', forming a first optical path, where each of said elements $F'''_p$ extracts an optical signal of band $\Lambda_p$;
- a plurality of transmitters $T'''_n$, n=1, 2, ... N''', coupled to said elements $E'''_n$ on a one to one basis; and
- a plurality of receivers $R'''_n$, n=1, 2, ... N''', coupled to said elements $F'''_n$ on a one to one basis; and where at least one of said bands $\Lambda_n$ is equal to one of said bands $\Lambda_p$.

30. A node comprising:
- a first optical path composed of a series connection of elements $E_i$, i=1, 2, ... N, where N is greater than 1, where each of said elements $E_i$ injects an optical signal of band $\Lambda_i$, and where $\Lambda_i$ is disjoint from $\Lambda_j$ for all i≠j, followed by a series connection of elements $F_j$, j=1, 2, ... M, where each of said elements $F_j$ extracts an optical signal of band $\Lambda_j$, and where at least one $\Lambda_i$ is equal to a $\Lambda_j$; and
- a second optical path, disjoint from said first optical path, composed of a series connection of elements $F_i$, i=1, 2, ... N, followed by series connection of elements $E_j$, j=1, 2, ... M;
- a plurality of transmitters $T_i$, i=1, 2, ... N, coupled to said elements $E_i$ on a one to one basis;
- a plurality of transmitters $T_j$, j=1, 2, ... M, coupled to said elements $E_j$ on a one to one basis
- a plurality of receivers $R_i$, i=1, 2, ... N, coupled to said elements $F_i$ on a one to one basis; and
- a plurality of receivers $R_j$, j=1, 2, ... M, coupled to said elements $F_j$ on a one to one basis;
- wherein a collection of elements that includes element $E_i$, element $F_i$, transmitter $T_i$, and receiver $R_i$ are housed in a single equipment module $M_i$, resulting in said node comprising a serially interconnected set of modules $M_i$, i=1, 2 ... N, with said interconnected set having
  an add-in node input port that is connected to module $M_1$,
  a drop-out node output port that is connected to module $M_1$,
  an add-in node output port that is connected to module $M_N$, and
  a drop-out node input port that is connected to module $M_N$.

31. A node, comprising:
a) a first module having an add-in port that leads to a set of elements that add an optical signal of a first wavelength, an add-out port that outputs an optical signal from said set of elements that add an optical signal, a drop-in port that leads to a set of elements that extract an optical signal of said first wavelength, and a drop-out port that outputs an optical signal from said set of elements that extract an optical signal;
b) said add-out port is physically disposed directly adjacent said drop-in port such that no other port is positioned between said add-out port and said drop-in port;
c) said add-in port is physically disposed directly adjacent said drop-out port such that no other port is positioned between said add-in port and said drop-out port.

32. A node as set forth in claim 31, further including:
a) second module having an add-in port that leads to a set of elements that add an optical signal of a second wavelength, an add-out port that outputs an optical signal from said set of elements that add an optical signal, a drop-in port that leads to a set of elements that extract an optical signal of said second wavelength, and a drop-out port that outputs an optical signal from said set of elements that extract an optical signal;
b) said add-out port is physically disposed directly adjacent said drop-in port such that no other port is positioned between said add-out port and said drop-in port; and,
c) connection elements that optically connect the add-out port of said first module to the add-in port of said second module, and the drop-out port of said second module is optically connected to the drop-in port of said first module.

33. A node as set forth in claim 32, wherein:
a) each of said first and second modules include first and second ends, said add-in port, said add-out port, said drop-in port and said drop-out port of each of said first and second modules are physically disposed adjacent the corresponding first end of said first and second modules and removed from the corresponding second end of said first and second modules.

34. A node as set forth in claim 33, wherein:
a) said add-out ports of said first and second modules are physically spaced less than two inches from the corresponding drop-in ports of said first and second modules; and, said add-in ports of said first and second modules are physically spaced less than two inches from the corresponding drop-out ports of said first and second modules.

* * * * *